I. W. DOEG.
OIL GUARD FOR SHAFT BEARINGS.
APPLICATION FILED NOV. 8, 1915.
1,211,106.
Patented Jan. 2, 1917.
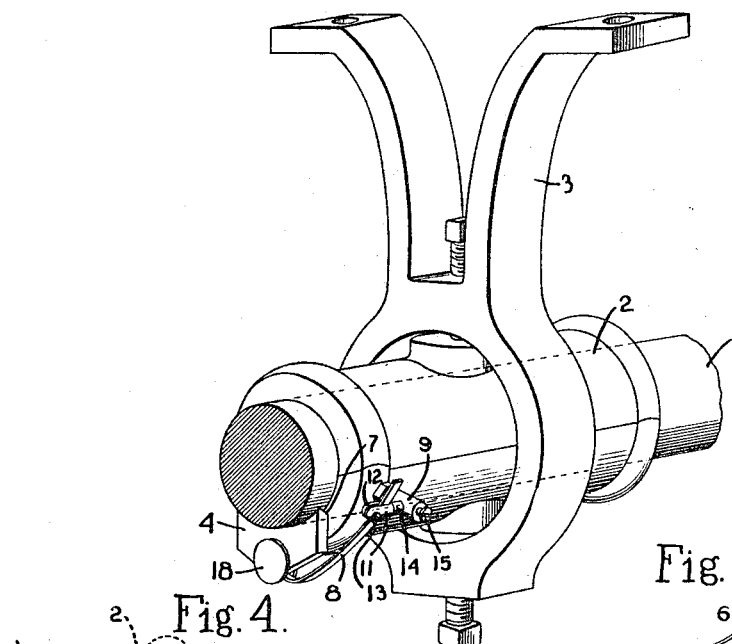
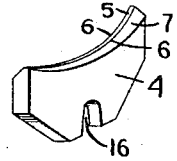
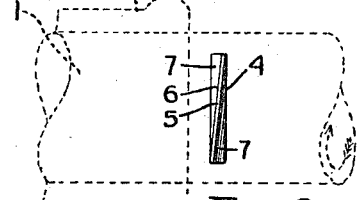
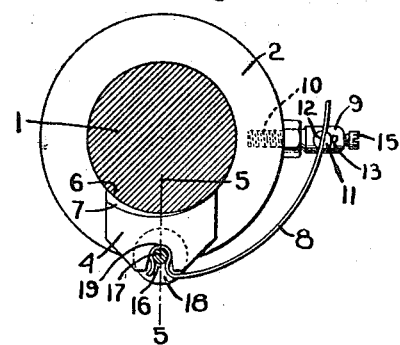
Inventor.
Issachar W. Doeg
by Heard Smith & Tennant
Attys.

UNITED STATES PATENT OFFICE.

ISSACHAR W. DOEG, OF EXETER, NEW HAMPSHIRE.

OIL-GUARD FOR SHAFT-BEARINGS.

1,211,106.  Specification of Letters Patent.  Patented Jan. 2, 1917.

Application filed November 8, 1915. Serial No. 60,197.

*To all whom it may concern:*

Be it known that I, ISSACHAR W. DOEG, a citizen of the United States, residing at Exeter, county of Rockingham, State of New Hampshire, have invented an Improvement in Oil-Guards for Shaft-Bearings, of which the following description, in connection with the accompanying drawing, is a specification, like characters on the drawing representing like parts.

This invention relates to an oil guard for a shaft bearing and has for its object to provide a novel guard which can be applied to any shaft bearing and which when applied will effectually prevent the oil from working along the shaft from the bearing.

The device comprises a member which fits and is yieldingly held against the shaft adjacent the bearing and which is provided with a wiping edge situated at an angle to the axis of the shaft so that as the shaft revolves, any oil which is carried by the shaft will be forced by the wiping edge back toward the bearing.

In order to give an understanding of my invention I have illustrated in the drawings a selected embodiment thereof which will now be described, after which the novel features will be pointed out in the appended claims.

In the drawings, Figure 1 is a perspective view of a shaft bearing with a portion of a shaft therein to which my improved oil guard is applied; Fig. 2 is an end view of the shaft bearing with the oil guard applied thereto, the shaft being shown in section; Fig. 3 is a perspective view of the oil guard member; Fig. 4 is a plan view thereof with the shaft shown in dotted lines; Fig. 5 is a section through the guard or wiping member on the line 5—5, Fig. 2.

1 indicates a shaft which is rotatably mounted in a shaft bearing 2 herein shown as supported in the shaft hanger 3. These parts may have any suitable or usual construction. My improved oil guard comprises a guard member or wiper 4 which is shaped to fit the shaft and is yieldingly held thereagainst, said wiper having a wiping edge which is inclined to the axis of the shaft in such a direction that as the shaft rotates said edge will force any oil carried by the shaft back along the shaft toward the bearing. The oil guard 4 may be made in various shapes without departing from the invention. The construction shown in the drawing is a comparatively thin plate-like member having the curved face 5 which fits the curvature of the shaft 1. The device is also shaped so that the edge 6 of the face 5 will stand at an inclination to the axis of the shaft when the device is sustained in its proper operative position. This is herein accomplished by making the edge 6 inclined relative to the longitudinal dimension of the member 4 and providing means for supporting the member 4 at right angles to the axis of the shaft 1. This particular construction is not essential, provided when the device is in operative position the inclined edge 6 is presented.

One convenient way of making the inclined edge 6 is to chamfer or bevel the corner of the member 4, as shown at 7, and to make the chamfer or bevel with a progressively-increasing depth from one end of the member 4 to the other. When this is done the edge 6 between the bevel 7 and the face 5 will have an inclined relation to the longitudinal dimension of the member 4. As a result any oil which works along the shaft 1 from the bearing 2 will be forced back toward the bearing by the inclined edge 6.

The guard 4 is yieldingly held against the shaft 1, and any suitable means capable of furnishing the desired yielding support may be provided. In the construction shown, the yielding support is in the form of a resilient arm 8 which is secured at one end to a post or bracket 9 extending from the bearing 2. The supporting post 9 is illustrated as provided with the screw-threaded end 10 which screws into the bearing 2 and said post has extending laterally therefrom a slotted arm 11, in the slot 12 of which the end of the resilient member 8 is received.

13 is a pinch screw by which the member 8 is clamped in the slot 12.

The arm 11 is adjustably sustained by the post 9, and in the present embodiment of my invention this is provided for by making the arm 11 with the stem portion 14 which extends through a transverse aperture in the post 9, said stem being held in adjusted position by the set-screw 15. The connection between the resilient arm or support 8 and the oil guard 4 is preferably a rocking connection so as to permit the member 4 to readily follow any unevenness in the exterior contour of the shaft 1. While any suitable connection between the supporting member 8 and the member 4 may be provided, I have found the construction illustrated to be a practical one. The member 4 is provided on its under side with a notch 16 in which is received a member 17 having two heads or flanges 18 which overlie the sides of the member 4. The end of the resilient member 8 is bent to present the U-shaped portion 19 which embraces the member 17 and is confined between the heads 18 thereof. The U-shaped portion 19 of the arm 8 is received in the notch 16, and this portion 19 forms a support on which the member 4 can rock to a limited extent. The member 4 can thus move relative to the arm 8 so as to insure that the face 5 will always fit the shaft 1, and the resiliency of the arm 8 will hold the member 4 yieldingly against the shaft 1. The pressure with which the member 4 is held against the shaft can be varied by turning the arm 11 in the post 9, turning movement of said arm in one direction serving to increase the force with which the resilient member 9 presses the member 4 against the bearing, and turning movement in the other direction decreasing said pressure. The set-screw 15 furnishes means by which the arm 11 is held in its adjusted position.

In attaching the device to the bearing it is necessary to place the member 4 so that the inclination of the wiping edge 6 will have a definite relation to the direction of rotation of the shaft in order to accomplish the desired result. Referring to Fig. 4, for instance, wherein the oil guard member 4 is shown in plan view and the shaft 1 in dotted lines, if it be assumed that the shaft is rotating clockwise when looked at from the right-hand side of Fig. 4, and that the bearing is at the left, as shown in dotted lines, then the member 4 will be placed as indicated with the inclination of the wiping edge 6 so that it is farther from the bearing at the upper side of the figure than at the lower side. As a result, any oil which may be working along the shaft 1 will be forced back toward the bearing by the edge 6 as the shaft rotates and thus the shaft will be kept clean. If the shaft is rotating in the opposite direction, then, of course, a member 4 will have to be used in which the shoulder 6 inclines oppositely from that shown in Fig. 4.

In the drawings the member 4 is shown as beveled on each side, each beveled portion 7 having a progressively-increasing depth from one end to the other of the member. This makes two inclined wiping edges 6, either one of which may be used.

While I have illustrated herein a selected embodiment of my invention, I do not wish to be limited to the constructional details shown as the principles of the invention may be embodied in other constructions. The essential feature is the provision of a member 4 which fits and is yieldingly held against the shaft and which is provided with a wiping edge having an inclination to the axial direction of the shaft and which is so situated relative to the bearing that as the shaft rotates any oil working along the shaft will be forced back toward the bearing by the inclined edge 6.

I claim:

1. In a device of the class described, the combination with a shaft and its bearing, of an oil guard situated exterior to said bearing and fitting and partially embracing the shaft, said guard having a wiping edge adjacent the bearing which is inclined relative to the axis of the shaft, and a resilient arm secured to the bearing and by which the oil guard is sustained.

2. In a device of the class described, the combination with a shaft and its bearing, of a resilient supporting member secured to the bearing, and an oil guard sustained on the supporting member for rocking movement, said oil guard having a face fitting and partially embracing the shaft, one edge of which face is inclined to the axial direction of the shaft and constitutes a wiping edge for preventing the oil working along the shaft.

In testimony whereof, I have signed my name to this specification.

ISSACHAR W. DOEG.

Copies of this patent may be obtained for five cents each, by addressing the "Commissioner of Patents, Washington, D. C."